Patented June 8, 1926.

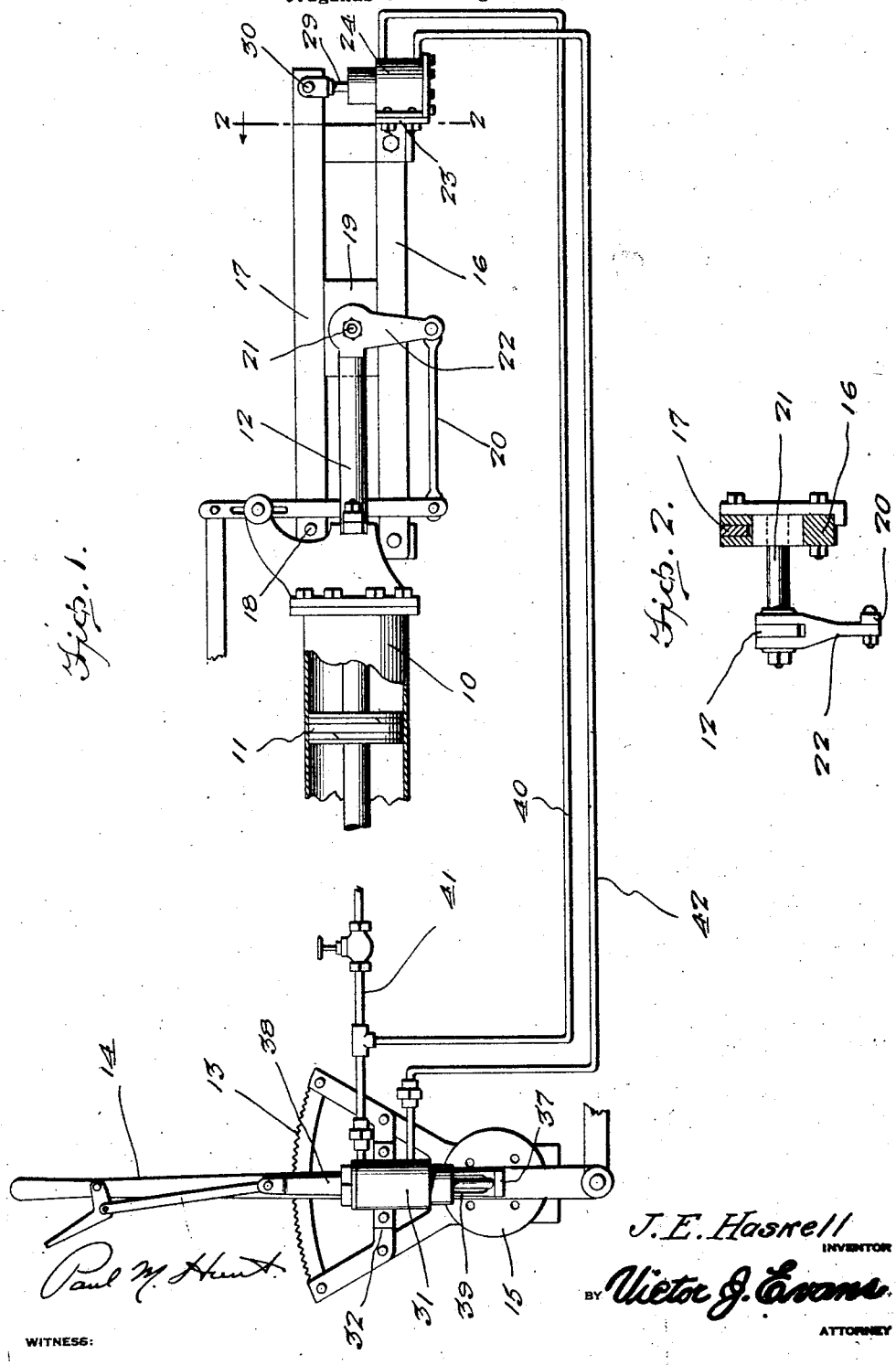

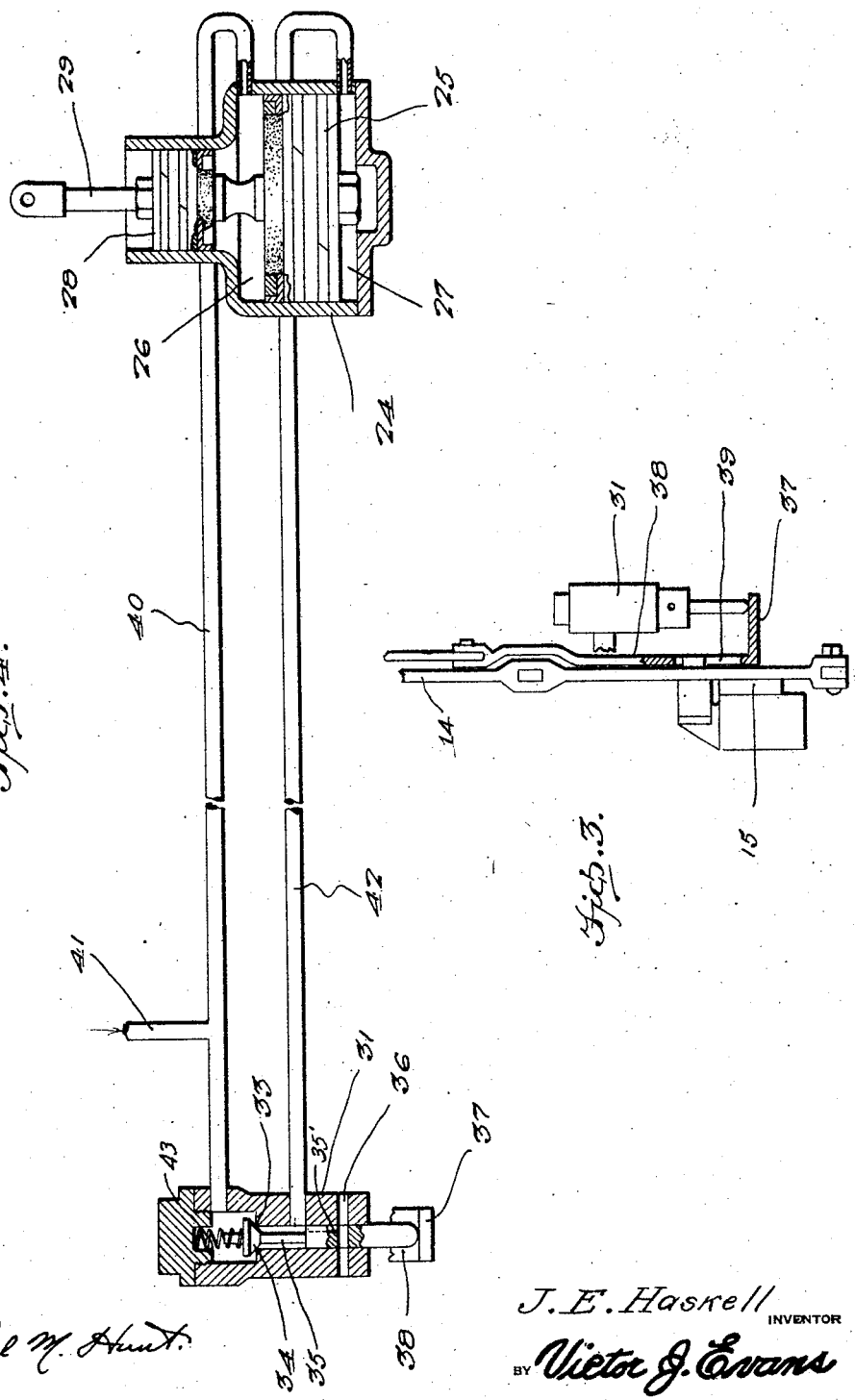

1,588,364

UNITED STATES PATENT OFFICE.

JOHN E. HASKELL, OF SPRINGFIELD, MISSOURI.

GEAR LOCK.

Application filed August 23, 1922, Serial No. 583,867. Renewed September 28, 1925.

This invention relates to power reverse gears for locomotives, and has particular application to an automatic lock therefor.

The use of a power reverse gear on locomotives has become so necessary that it is practically impossible to handle a locomotive without a gear of this kind, and difficulty has been experienced in preventing creeping of the power gear under certain conditions. It is impossible to hold the gear steady at all times, and when working hard with lever in "cut off" the gear will creep causing the waste of fuel and the gear creeping at this time causes loss of power. This device enables the engineer to work his lever higher up or nearer the center and the gear remains steady under all conditions.

It is therefore the object of this invention to provide a mechanism which is very simple in construction, and one which can be easily installed on any locomotive, the mechanism operating to effectively lock the valve against creeping, the mechanism being always under the control of the engineer, and operable simultaneously with the operation of the reverse gear lever.

The nature and advantages of the invention will be better understood when the following detailed description is read in connection with the accompanying drawings, the invention residing in the construction, combination, and arrangement of parts as claimed.

In the drawings forming part of this application, like numerals of reference indicate similar parts in the several views, and wherein:—

Figure 1—is a fragmentary view of the reverse gear, showing the application of the invention thereto.

Figure 2—is a sectional view taken on line 2—2 of Figure 1.

Figure 3—is a vertical sectional view taken through the parts for operating the valve which forms a portion of the present invention.

Figure 4—is a longitudinal sectional view through Figure 1, showing the different valve constructions, and their connections with the main line pressure.

While the invention may be used with any type of power reverse gear, I have illustrated the invention with the well-known Lewis reverse gear, wherein 10 indicates the reverse cylinder in which the piston 11 operates, a piston rod being indicated at 12. 13 indicates the toothed quadrant, while the reverse gear lever together with its pawl and lever therefor is indicated generally at 14.

The rotary valve forming part of the reverse gear is indicated at 15.

In order to use the invention in connection with the Lewis gear above referred to, it is only necessary to make use of a guide indicated at 16 and a locking member or jaw 17. The guide and jaw are arranged in super-imposed relation, the guide 16 being stationary, while the jaw guide 17 is pivoted at one end as at 18 for a purpose to be presently described. Operating between the guide and jaw is a sliding block 19 which is associated with the reach rod 20 by means of a pin 21. This reach rod 20 is connected in any suitable manner as at 22 with the adjacent end of the piston rod 12, the sliding block 19 operating with the piston as will be readily understood.

Supported by suitable brackets 23 associated with the guide 16 is a cylinder 24 divided by a piston 25 into an upper chamber 26, and a lower chamber 27. It will be noted that the cylinder 24 has a reduced upper portion in which is arranged to reciprocate a smaller piston 28, this piston being provided with a piston rod 29 which projects beyond the adjacent end of the cylinder and suitably coupled as at 30 with the adjacent end of the pivoted jaw 17. The large piston is secured to the lower piston and below the same as clearly shown in Figure 4 of the drawings. Fluid is admitted to the cylinder 24 in a manner and for a purpose to be hereinafter described.

An operating or control valve including a cylinder 31 is associated with the quadrant 13 by means of a suitable bracket 32, the latter being bolted or otherwise suitably secured to the quadrant as shown.

The cylinder is provided with a seat 33 normally engaged by a spring pressed valve 34, this valve including a stem 35 which slides through the valve casing, and designed to control an exhaust port 36 in the lower end of the cylinder. The valve stem projects beyond the lower end of this cylinder and normally reposes upon an offset extremity 37 of an operating element 38, the latter being connected with the control lever in a manner illustrated in Figure 1. It will be noted that the control element 38 is slotted as at 39 to receive the nut on the control lever 14, this slot permitting movement of the control element 38 for a purpose to be presently set forth.

A pipe 40 establishes communication between the cylinder 31 and the chamber 26 of the cylinder 24 and this pipe is supplied with air from the main line by means of a branch pipe 41. The pipe 40 is always in open communication with the main line pressure. Arranged substantially parallel with the pipe 40, is a pipe 42, which has one end communicating with the cylinder 31 at a point beneath the valve seat, while the opposite end of this pipe 42 communicates with the chamber 27 of the cylinder 24. The operation of the mechanism is as follows:

Pressure fluid from the main reservoir enters the cylinder 31 about the valve 34, and the chamber 26 of the cylinder 24 at all times.

When the reverse lever is operated and the controlling element 38 lifted, the offset extremity 37 of this element 38 raises the valve 34 off its seat, and pressure fluid from the main reservoir is then allowed to pass through the pipe 42 into the lower chamber 27 of the cylinder 24.

When the pressure on the under side of the piston 25 becomes greater than the pressure on the top side thereof, owing to the difference in area of the respective sides of the piston, the pistons 25 and 28, which latter is connected with the piston 25 and with the pivoted jaw, are elevated thereby elevating the jaw and allowing the block 19 to move freely on the guide 16 simultaneously with the piston 11. When the element 38 is lowered, the valve 34 is seated by the pressure from the main reservoir assisted by the spring 43, and consequently pressure from the main reservoir to the lower chamber 27 of the cylinder 24 is cut off. The fluid contained in the chamber 27 is now exhausted through the pipe 42 passing through the latter to the cylinder 31 and thence to the exhaust port 36 of this cylinder. The valve stem 35 is provided with a groove as at 35', to permit of communication between the pipe 42 and the exhaust port 36. The piston 25 being larger than the piston 29 is forced downwardly by the pressure admitted to the chamber 26, thereby lowering the upper guide 17 to a position where it together with the guide 16 grips the sliding block 19, holding the latter against movement. As this block is associated with the piston 11, it is obvious that the piston is also held against movement incident of the gear lever, and there is no possible way for the gear to creep with a resultant waste of fuel as hereinabove pointed out.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A power reverse gear for locomotives including a cylinder, a piston operating therein and having a piston rod, a reverse gear lever, a stationary guide, a jaw arranged above said guide and being susceptible of movement toward and away from the same, a sliding block operated on the guide and connected with the piston rod for movement therewith, a second piston having a reduced upper portion, a pair of spaced pistons operating in the second cylinder, one piston of each pair fitting the reduced portion and the other piston of the pair fitting the remaining portion, the piston rod associated with the pistons and secured to the movable jaw, means for conveying fluid under pressure to said second cylinder between the pistons thereof to retain the latter in normal position and clamp the block against the guide by engagement of the jaw therewith, means for conveying fluid below the piston fitting the said remaining portion for moving said pistons of the second mentioned cylinder whereby said movable jaw is arranged to permit free movement of the sliding block on the guide, and a valve controlled by the lever for controlling the admittance and exhaust of pressure to and from the cylinder second mentioned.

2. A power reverse gear for locomotives, a cylinder, a piston operating therein and having a piston rod, a reverse gear lever, a stationary guide, a movable jaw spaced from said guide, a sliding block movable between the movable jaw and guide, a second cylinder including a reduced portion and being arranged adjacent one end of the guide, fluid actuated means including a large and small piston operating within the corresponding respective portions of the cylinder, said pistons being secured for simultaneous movement and the small piston being connected with said movable jaw, means for introducing a fluid under pressure in the second cylinder between the pistons therein to retain said pistons in normal position and the jaw in clamping position, and a second means for introducing fluid under pressure below the large piston to move said pistons whereby the jaw is positioned to permit free movement of the sliding block, means for controlling the admittance of pressure to the second mentioned cylinder below the large piston and also the exhaust from said second mentioned cylinder, said last mentioned means including a valve cylinder, a normally seated valve operating said valve cylinder and including a grooved stem, and said valve cylinder having an exhaust port controlled by the stem and its groove and a valve operating element engaging the stem for movement thereof and its valve and being associated with the reverse gear lever.

In testimony whereof I affix my signature.

JOHN E. HASKELL.